US011195047B2

(12) United States Patent
Huber, Jr. et al.

(10) Patent No.: US 11,195,047 B2
(45) Date of Patent: Dec. 7, 2021

(54) DIGITAL IMAGE GENERATION THROUGH AN ACTIVE LIGHTING SYSTEM

(71) Applicant: ID Metrics Group Incorporated, Manchester, NH (US)

(72) Inventors: Richard Austin Huber, Jr., Weehawken, NJ (US); Matthew William Flagg, San Diego, CA (US); Satya Prakash Mallick, San Diego, CA (US)

(73) Assignee: ID Metrics Group Incorporated, Kirkland, WA (US)

( * ) Notice: Subject to any disclaimer, the term of this patent is extended or adjusted under 35 U.S.C. 154(b) by 50 days.

(21) Appl. No.: 16/437,869

(22) Filed: Jun. 11, 2019

(65) Prior Publication Data

US 2019/0377970 A1 Dec. 12, 2019

Related U.S. Application Data

(60) Provisional application No. 62/683,993, filed on Jun. 12, 2018.

(51) Int. Cl.
*G06K 9/54* (2006.01)
*G06T 5/50* (2006.01)
(Continued)

(52) U.S. Cl.
CPC ........... *G06K 9/54* (2013.01); *G06K 9/00442* (2013.01); *G06K 9/4661* (2013.01);
(Continued)

(58) Field of Classification Search
CPC .... G06T 5/50; G06T 7/33; G06T 7/40; G06T 3/0093; G06T 5/30; G06T 7/0002;
(Continued)

(56) References Cited

U.S. PATENT DOCUMENTS

2003/0169923 A1* 9/2003 Butterworth ............. G06K 9/20
382/181
2007/0147820 A1* 6/2007 Steinberg ............... H04N 5/272
396/155

(Continued)

FOREIGN PATENT DOCUMENTS

CN 104751465 A 7/2015

OTHER PUBLICATIONS

International Search Report and Written Opinion for Int'l Application No. PCT/US2019/036573, dated Aug. 30, 2019, 18 pages.

(Continued)

*Primary Examiner* — CongVan Tran
(74) *Attorney, Agent, or Firm* — Fish & Richardson P.C.

(57) ABSTRACT

Methods, systems, and apparatus, including computer programs encoded on a computer storage medium, for an active lighting system. In one aspect, a method includes receiving a first image of the physical document having a first glare signature and a second image of the physical document having a second glare signature that is different from the first glare signature; determining a first glare map of the first image and a second glare map of the second image; comparing the first glare map to the second glare map; and generating the digital image based on the comparison of the first and second glare maps.

20 Claims, 8 Drawing Sheets

(51) Int. Cl.
*G06T 7/33* (2017.01)
*G06T 7/40* (2017.01)
*G06T 3/00* (2006.01)
*G06T 5/30* (2006.01)
*G06T 7/00* (2017.01)
*G06K 9/46* (2006.01)
*G06K 9/00* (2006.01)

(52) U.S. Cl.
CPC .............. *G06T 3/0093* (2013.01); *G06T 5/30* (2013.01); *G06T 5/50* (2013.01); *G06T 7/0002* (2013.01); *G06T 7/33* (2017.01); *G06T 7/40* (2013.01); *G06K 2209/01* (2013.01); *G06T 2207/10152* (2013.01); *G06T 2207/20221* (2013.01); *G06T 2207/30176* (2013.01)

(58) Field of Classification Search
CPC . G06T 2207/30176; G06T 2207/10152; G06T 2207/2022; G06K 9/54; G06K 9/4661; G06K 9/00442; G06K 2209/01
USPC .......................................................... 382/162
See application file for complete search history.

(56) References Cited

U.S. PATENT DOCUMENTS

| | | | | |
|---|---|---|---|---|
| 2012/0087551 A1* | 4/2012 | Bhagwan | ........... | G06K 9/00255 |
| | | | | 382/118 |
| 2014/0218385 A1* | 8/2014 | Carmi | ..................... | G06T 7/136 |
| | | | | 345/590 |
| 2015/0063720 A1 | 3/2015 | Maltz et al. | | |
| 2015/0138399 A1* | 5/2015 | Ma | ........................... | G06T 11/60 |
| | | | | 348/239 |
| 2016/0071289 A1* | 3/2016 | Kobayashi | ........... | H04N 1/6086 |
| | | | | 382/167 |
| 2016/0073035 A1 | 3/2016 | Yamamoto | | |
| 2016/0337545 A1 | 11/2016 | Kumar et al. | | |
| 2016/0360119 A1* | 12/2016 | Ilic | ............................ | G06K 9/18 |
| 2017/0286764 A1 | 10/2017 | Ma et al. | | |
| 2018/0107887 A1 | 4/2018 | Huber | | |
| 2018/0232572 A1* | 8/2018 | Nepomniachtchi | ........................ | |
| | | | | G06K 9/00442 |
| 2019/0251774 A1* | 8/2019 | Azanza Ladron | ........ | G06T 7/97 |
| 2019/0303664 A1* | 10/2019 | Hightower | ........... | G06K 9/2081 |
| 2020/0202503 A1* | 6/2020 | Mayer | ................... | H04N 5/217 |

OTHER PUBLICATIONS

EP Extended European Search Report and Written Opinion in European Appln. No. EP 19819379.9, dated Jun. 1, 2021, 9 pages.
Jiao et al., "Highlight removal for camera captured documents based on image stitching," 2014 IEEE 12th International Conference on Signal Processing (ICSP), Nov. 6, 2016, 849-853.

* cited by examiner

DIGITAL IMAGE GENERATION THROUGH AN ACTIVE LIGHTING SYSTEM

CROSS-REFERENCE TO RELATED APPLICATIONS

This application claims the benefit under 35 U.S.C. § 119(e) of U.S. Patent Application No. 62/683,993, entitled "Digital Image Generation Through An Active Lighting System," filed Jun. 12, 2018, which is incorporated herein by reference in its entirety.

TECHNICAL FIELD

This specification generally relates to systems and methods for capturing documents for general analysis.

BACKGROUND

This specification describes technologies for detecting tampered physical documents and extracting information from documents based on digital images. The use of physical identification documents has been pervasive in various industries for decades. Moreover, in recent years, digital images of identification documents are increasingly being used for conducting secure, electronic transactions. Current techniques for authenticating imaged identification documents involve systems configured to scrutinize certain security features physically embedded into the underlying document. These security features are, by design, extremely difficult to replicate, and therefore effectively thwart attempts to produce counterfeit copies of the document. Many security features currently in use include intricate print patterns, digital watermarks, micro-printed text, unique emblems or logos, holograms, and the like. Conventional authentication techniques for processing these imaged identification documents is performed by systematically decoding information from a digital watermark and/or employing text or pattern matching techniques to verify the legitimacy of one or more other security features.

SUMMARY

This specification describes technologies for an active lighting system employed to fuse digital images for enhanced document analysis. More specifically, implementations are directed to techniques (e.g., methods, systems, devices, etc.) to an active lighting system for generating a merged image of a physical document based on glare maps generated from multiple images of the physical document each having distinct glare signatures. The merged image may be employed in detecting the digital or physical tampering of physical documents based on one or more aspects that are intrinsic to a digital image, and not, for example, associated with extracted text (e.g., text identified by optical character recognition) or other encoded data (e.g., data encoded in security features or machine readable zones). Such aspects include pixel features that provide evidence of physical and/or digital tampering, as well as certain benign pixel features that include, but are not limited to: environmental, capture device, credential wear, lighting effects, hardware/software quantization, and/or digital compression effects. In some examples, these tamper-detection techniques are applied to one or more specific regions of interest (e.g., high value identification regions of the physical documents).

Digital images of physical documents, as discussed in this disclosure, are digital images of the physical documents suitable for use in electronic transactions. The term "electronic transactions" refers broadly to any computer-facilitated exchange between a possessor of a physical or imaged identification document and one or more third parties. Electronic transactions can be conducted in-person or remotely via computer networks. Some electronic transactions may include the exchange of currency, but others may not. Suitable physical documents for conducting secure, electronic transactions may include, but are not limited to, personal identity, employment, or professional credentials or certifications, or other high value identity-assertion documentation (e.g., a driver's license or a passport). Further, in some implementations, suitable physical documents may include so-called "breeder documents" (e.g., birth certificates, marriage certificates, social security documents, as well as utility bills, service bills, and other vital data correlation documents). The terms "physical document" may be used throughout this disclosure when referring to any document designed for identity certification, assertion, or authorization that includes identification data. The "identification data" may include one or more of the following: an identification photograph, biographical information (e.g., a date of birth, an identification serial number, a social security number, a physical or electronic mailing address, a height, eye color, and gender), and/or one or more machine readable zones (MRZs) (e.g., a barcode or a Q-code). In some implementations, the identification data may further include other biometric information in addition to the ID photo, such as fingerprints, hand geometry, retina patterns, iris patterns, handwriting patterns, and/or other physical morphological identity characteristics. Regions of the imaged identification document that contain this identification data are referred to generally as "high value regions" throughout the present disclosure because of their importance in identifying the document's possessor in an electronic transaction.

One or more embodiments of the present disclosure are resultant of a realization that conventional techniques for authenticating imaged physical documents are difficult to implement, prone to failure, and/or suffer from severe security vulnerabilities. As one example, authentication techniques reliant upon security features can be difficult to implement on a large scale because they require modifications to the physical documents to insert physical security features. This amounts to a reissuance of the credential to each possessor. These modifications can take a long time to propagate through a large universe of physical credentials, such as passports and driver's licenses, because users tend to replace them infrequently. Thus, for instance, it could take years to fully implement a digital watermarking system that requires coded data to be embedded in each document. These conventional authentication techniques can also be prone to failure because the decoding and/or text/pattern recognition routines require the identification document to be imaged in very particular lighting conditions and/or alignment orientations. It often takes the user several attempts to achieve a suitable image capture (e.g., images that are free of unwanted image artifacts, such as glare, motion blur, blooming, dirty lens blur, and so forth). Capture modalities, such as passport scanners with active UV and near-IR lighting, may also not be relevant when a mobile device, such as a smartphone, is desired as the capture device. Moreover, while conventional security features can be effective at inhibiting or preventing successful counterfeiting, they are not helpful in detecting whether an authentically issued physical identification document has been digitally or manually tampered with. For example, the possessor of an authentic identification document may tamper with that document by replacing or altering certain high value regions (e.g., photos, biometrics, biographics, and MRZs) that are critical for identifying the possessor in electronic transactions.

This type of tampering can often be achieved without affecting the embedded security features (e.g., where the security features do not overlap with the high value regions of the identification document), and thus will not be detected by conventional authentication techniques, which allows the document possessor to hide or outright replace critical information in order to conceal his/her identity. Moreover, it is relatively simple to manipulate non-security feature aspects of the identification document, including the high value regions, using commercially available image editing software. Of course, attempts at tampering with physical documents tend to vary in type and level of sophistication. At the lower sophistication levels, entire regions of the identification document may be altered or replaced (digitally or physical) without making any attempts to match texture or font. Other attempts may be more refined. For example, the forger may utilize special software in an attempt to meticulously recreate backgrounds, security features, and the like. As yet another example, the forger may attempt to homogenize the modified portions of the image by taking a new live photo of a printout or screenshot of the splice or tamper. These and a myriad of other tamper techniques can be used to effectively undermine conventional authentication methods.

Accordingly, embodiments of the present disclosure aim to resolve these and other problems with conventional authentication techniques by providing a fundamental paradigm shift in the field that does not rely solely on security features to verify the legitimacy of imaged physical documents. In a general implementation, the present disclosure relates to a system that includes one or more processors and a computer-readable storage device coupled to the one or more processors. Instructions are stored on the computer-readable storage device that when executed by the one or more processors, cause the one or more processors to perform operations. These operations include receiving a first image of a physical document having a first glare signature and a second image of the physical document having a second glare signature that is different from the first glare signature. The first image and the second image are aligned based on the physical document by 1) estimating a homography using features from accelerated segment test (FAST) detector and an oriented FAST and rotated Binary Robust Independent Elementary Features (ORB) detector to provide a description of texture around the physical document as depicted in each image, and 2) warping each pixel in the second image with the first image through a bi-linear interpolation. A first glare map of the first image is determined by generating a first greyscale image of the first image. A second glare map of the second image is determined by generating a second greyscale image of the second image. The first glare map and the second glare map are dilated to expanded regions of glare represent on each map. The first glare map is compared to the second glare map. A digital image is generated by replacing the regions of glare in the first image with respective mapped regions from the second image, wherein the mapped regions from the second image do not include glare.

In another general implementation, a computer-implemented method for providing a digital image of a physical document includes receiving a first image of the physical document having a first glare signature and a second image of the physical document having a second glare signature that is different from the first glare signature. A first glare map of the first image and a second glare map of the second image are determined. The first glare map to the second glare map are compared. The digital image is generated based on the comparison of the first and second glare maps.

In yet another general implementation, one or more non-transitory computer-readable storage media coupled to one or more processors and having instructions stored thereon which, when executed by the one or more processors, cause the one or more processors to perform operations. These operations include receiving a first image of a physical document having a first glare signature and a second image of the physical document having a second glare signature that is different from the first glare signature. A first glare map of the first image and a second glare map of the second image are determined. The first glare map to the second glare map are compared. A digital image is generated based on the comparison of the first and second glare maps.

In an aspect combinable with any of the general implementations, the first image is taken with a flash, and wherein the second image is taken without a flash.

In another aspect combinable with any of the previous aspects, the first image and the second image are taken in succession within a threshold temporal distance.

In another aspect combinable with any of the previous aspects, the operation or method includes before determining the first glare map of the first image and the second glare map of the second image, aligning the first image and the second image based on the physical document.

In another aspect combinable with any of the previous aspects, the aligning of the first image and the second image includes: estimating a homography using a FAST detector and an ORB detector to provide a description of texture around the physical document as depicted in each image; and warping each pixel in the second image with the first image through a bi-linear interpolation.

In another aspect combinable with any of the previous aspects, the homography is estimated based on a random sample consensus (RANSAC) algorithm.

In another aspect combinable with any of the previous aspects, the determining of the first glare map of the first image includes generating a first greyscale image of the first image, and determining a second glare map of the second image includes generating a second greyscale image of the second image.

In another aspect combinable with any of the previous aspects, the first glare map and the second glare map are each binary images where each pixel represents either glare or no glare.

In another aspect combinable with any of the previous aspects, the operations or method includes before comparing the first glare map to the second glare map, dilating the first glare map and the second glare map to expanded regions of glare represent on each map.

In another aspect combinable with any of the previous aspects, the digital image is generated by replacing the regions of glare in the first image with respective mapped regions from the second image, wherein the mapped regions from the second image do not include glare.

In another aspect combinable with any of the previous aspects, the mapped regions from the second image are merged into the first image to form the digital image through Poisson imaging blending.

In another aspect combinable with any of the previous aspects, gradient information throughout the replaced regions of glare is employed to interpolate a color propagated from a boundary of each replaced glare region in the generated digital image.

In another aspect combinable with any of the previous aspects, the mapped regions from the second image are merged into the first image to form the digital image through a Mean Value Coordinates (MVC) for Instant Image Cloning algorithm.

In another aspect combinable with any of the previous aspects, the digital image is employed in an analysis of the physical document to identify text or data elements in the physical document.

In another aspect combinable with any of the previous aspects, the analysis of the physical document includes at least one of optical character recognition (OCR), optical word recognition (OWR), intelligent character recognition (ICR), intelligent word recognition (IWR), natural language processing (NLP), or machine learning.

In another aspect combinable with any of the previous aspects, the digital image is employed in an analysis of the physical document to detect digital tampering or physical tampering.

In another aspect combinable with any of the previous aspects, the physical document is a professional or government-issued credentials or certifications.

It is appreciated that techniques, in accordance with the present disclosure, can include any combination of the aspects and features described herein. That is, techniques in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

One or more embodiments of the present disclosure involve systems and methods for an active lighting system for generating a merged image of a physical document for conducting electronic transactions. In particular, certain embodiments may include processing received images of a physical document to generate glare maps based on the distinct glare signatures of each received image. The glare maps are compared to generate the merged image. The merged image may be employed in a broad range of applications including OCR, face recognition (removing glare from the face), and tamper detection. For example, the merged image may be employed in detecting the digital or physical tampering of the physical document based on one or more aspects that are intrinsic to a digital image, and not, for example, associated with extracted text (e.g., text identified by optical character recognition) or other encoded data (e.g., data encoded in security features or machine readable zones).

Figure 1:
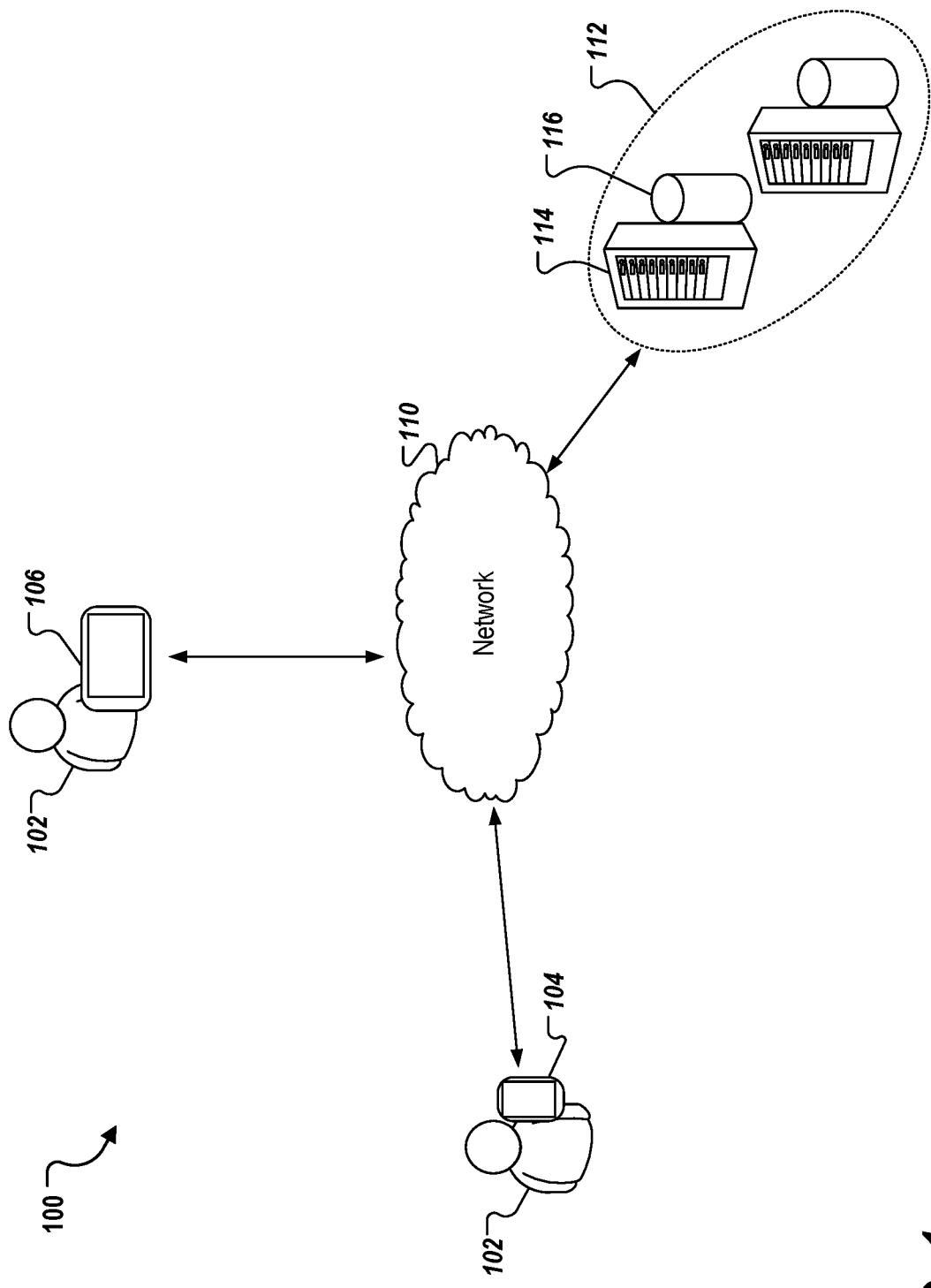
FIG. 1 depicts an example environment that can be employed to execute implementations of the present disclosure.

FIG. 1 depicts an example environment 100 that can be employed to execute implementations of the present disclosure. The example environment 100 includes mobile computing devices 104, and 106, a back-end system 112, and a network 110. In some implementations, the network 110 includes a local area network (LAN), wide area network (WAN), the Internet, or a combination thereof, and connects web sites, devices (e.g., the mobile computing devices 104 and 106) and back-end systems (e.g., the back-end system 112). In some implementations, the network 110 can be accessed over a wired and/or a wireless communications link. For example, mobile computing devices (e.g., the smartphone device 104 and the tablet device 106), can use a cellular network to access the network 110.

In the depicted example, the back-end system 112 includes at least one server system 114 and a data store 116. In some implementations, back-end system 112 provides access to one or more computer-implemented services that users 102 can interact with using the mobile computing devices 104 and/or 106. The computer-implemented services may be hosted on, for example, the at least one server system 114 and a data store 116. The computer-implemented services may include, for example, an image merging service. In some implementations, the back-end system 112 includes computer systems employing clustered computers and components to act as a single pool of seamless resources when accessed through the network 110. For example, such implementations may be used in data center, cloud computing, storage area network (SAN), and network attached storage (NAS) applications. In some implementations, back-end system 112 is deployed and provides computer-implemented services through a virtual machine(s).

The mobile computing devices 104 and 106 may each include any appropriate type of computing device, such as a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 104 is provided as a smartphone and the computing device 106 is provided as a tablet-computing device. It is contemplated, however, that implementations of the present disclosure can be realized with any of the appropriate computing devices, such as those mentioned previously. For example, the mobile computing devices 104 and 106 can also be a less readily portable type of computing device, such as a desktop computer, laptop computer, smart appliance, gaming console, and so forth.

Implementations of the present disclosure are described in further detail herein with reference to an example context. The example context includes the user 102 providing an image of a document for processing. For example, the user 102 may need to provide a government-issued identifier or credential, such as a passport, to be validated. It is contemplated, however, that implementations of the present disclosure can be realized in any appropriate context. Other example contexts include automatic user-worn badge authentication, such as when walking through a security gate; data extraction from general materials printed with non-diffuse materials, such as polycarbonate gift cards or product packaging with multiple non machine readable identifiers; and machine vision applications in, for example, a factory where objects roll on conveyor belts at high speeds.

Figure 2:
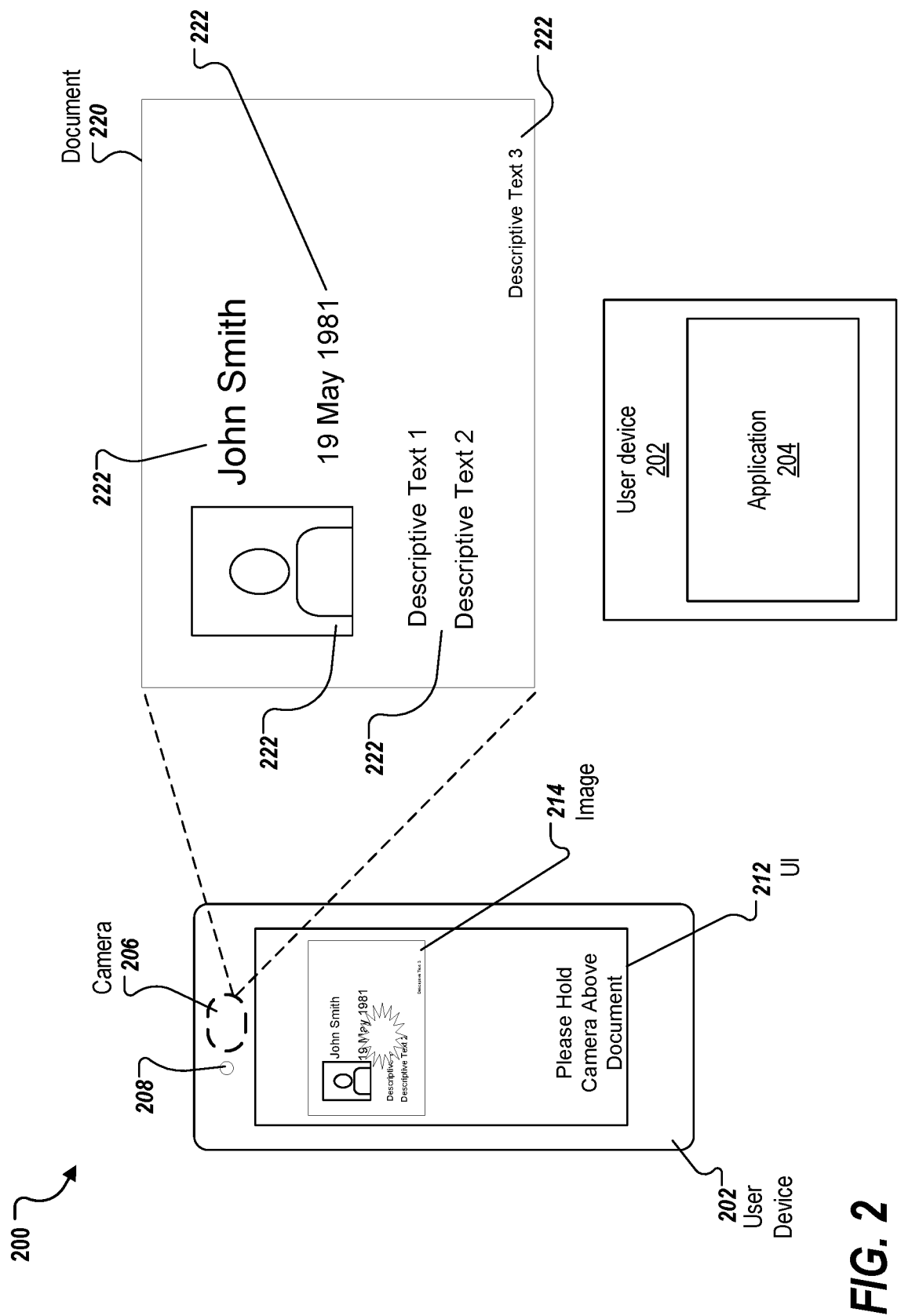
FIG. 2 depicts an example system for capturing two or more images of a document for processing according to implementations of the present disclosure.

FIG. 2 depicts an example system 200 for capturing two or more images of a physical document 220 for processing according to implementations of the present disclosure. Device 202 is substantially similar to the mobile computing devices 104 and 106 depicted in FIG. 1. The device 202 includes one or more lights 208 and one or more cameras 206 that capture image(s) and/or video data of a field of view in proximity to the device 202. In some instances, the camera(s) 206 may be peripheral device(s) connected to the device 202 over a wired or wireless network, as opposed to built-in components of the device 202. The camera(s) 206 can capture images and/or video data of a physical object, such as the physical document 220. In the example system 200, the imaged object is a physical document 220, such as described in detail above. The image data generated by the camera(s) 206 can include at least two still images and/or video data of the imaged object. The light(s) 208 may generate a "flash" of light when the camera(s) 206 capture an image. This flash of light can be on any band on the electromagnetic spectrum that is relevant to document processing in the face of glare. Examples include not only visible light, but also infrared light and ultraviolet light.

Implementations support the use of any suitable type of device 202 that a user, such as the user 102 depicted in FIG. 1, can employ to interact with the application 204 through the user interface (UI) 212. The UI 212 displays content to the user. The application 204 may be programed to assist an untrained, non-technical user by employing the camera(s) 206 to capture images 214 and to actively change the lighting between captured images. For example, the application 204 may be programed to capture images within a configurable threshold of one another and/or with or without a flash (e.g., a flash and a no-flash image). In some implementations, the application 204 provides the captured images to an image merging service provided by a back-end system, such as back-end system 112 depicted in FIG. 1. In some implementations, the application 204 includes the image merging service. The image merging service, either remotely hosted or included in the application 204, employs an active lighting system such as described in detail herein.

In some implementations, an active lighting system merges at least two images with distinct glare signatures (e.g., dissimilar glare regions) to form a merged or composite image. A glare signature may refer to the glare regions of a particular image. Glare or specular reflection refers to the reflected light captured in the images(s). In some examples, dissimilar glare refers glare that is not uniform between the images and thus the images have a distinct glare signature. These distinct glare signatures provides the structure to merge together the images so that details, such as the identification data elements 222, that are hidden or occluded may be revealed in the generated merged image.

For example, an image taken with no flash may include glare region(s) where a reflection of the ambient lighting from the environment (e.g., from a light fixture in the ceiling) off the captured physical document 220 was captured in the image. These regions of glare in images of the physical document 220 may obstruct, for example, some or all of the characters in the identification data elements 222. These obstructed glare regions may render the characters illegible for processing. The active lighting system uses this no-flash image along with an image of the same physical document 220, but taken in different lighting (e.g., with a "flash" of light from the light 208) to form a merged image (see e.g., FIG. 3C) to show the obstructed details of the physical document 220. Other ways of capturing images with distinct glare signatures for use within the described active lighting system include capturing images using dissimilar colors of light or with a flash in differing locations (e.g., two lights 208 positioned on the different corners of the device 202). Examples of no-flash and flash images are depicted in FIGS. 3A and 3B respectively.

In some implementations, the bulk of a merged image generated by the active lighting system is taken from one of the images submitted for processing. This image may be referred to as the primary image. The other image(s) may be used to fill-in in the glare regions of the primary image. This image(s) may be referred to as the secondary image(s). For example, for a flash and a no-flash image of the physical document 220, the flash image may serve as the primary image and the no-flash image as the secondary image (or vice versa). In such an example, the active lighting system may use the pixels from the primary image, except for those in the glare region(s), for the merged image. For the pixels in the glare region(s), the active lighting system detects the glare region(s) on the primary image and then blends or interpolates the color in that glare region using the secondary image as the source of interpolation. In other implementations, the merged image is generated by the active lighting system with each pixel as an actual mixture between the respective pixels in the primary and secondary images aligned according to, for example, the depicted document 220 (e.g., some of the color comes from no flash and some of it comes from flash). Example processes for generating a merged image by the active lighting system are described in FIGS. 4A and 4B.

Once generated by an active lighting system, analysis of a merged image of the physical document 220 may be employed to, for example, determine one or more identification data elements 222 that are present in the physical document 220. Such identification data elements 222 can include text portions (e.g., alphanumeric text) of any suitable length, such as one or more characters, words, phrases, sentences, numbers, symbols, barcodes, and/or other text elements. The identification data elements 222 can also include at least a portion of one or more graphic elements and/or images that are printed onto the physical document 220. The document analysis can include any suitable technique for OCR, OWR, ICR, IWR, NLP, machine learning, parsing, and/or other techniques for identifying particular text elements or other data elements in the physical document 220. The document analysis can include detecting digital tampering or physical tampering by removing the nuisance of glare, which could potentially cover up or oversaturate a tamper region, such as a manipulated date of birth. Other techniques for document analysis are discussed in U.S. Patent Publication No. 2018/0107887, which is incorporated by reference herein.

Figure 3A:
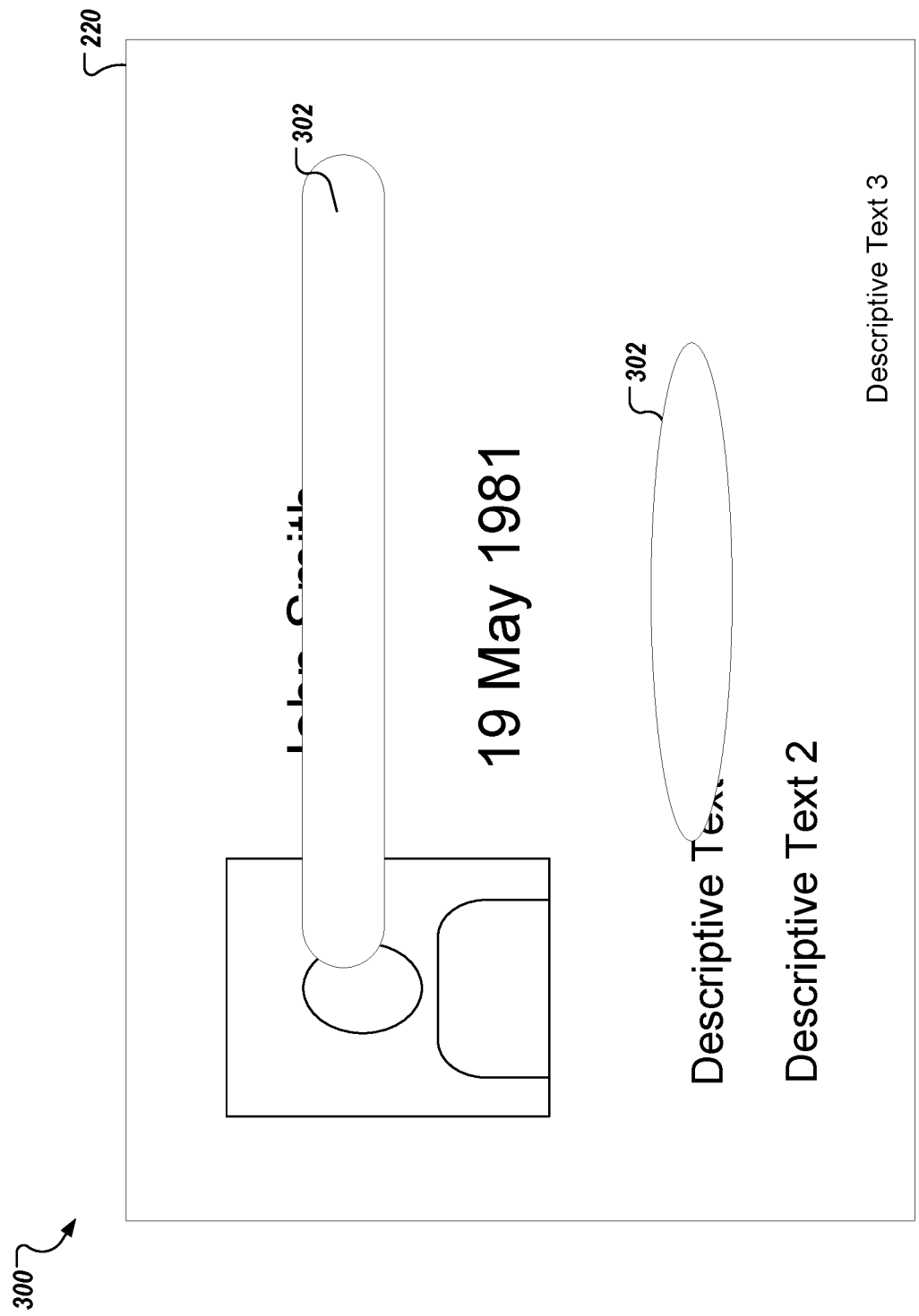
FIGS. 3A-3C depict example images of a physical document.
Figure 3B:
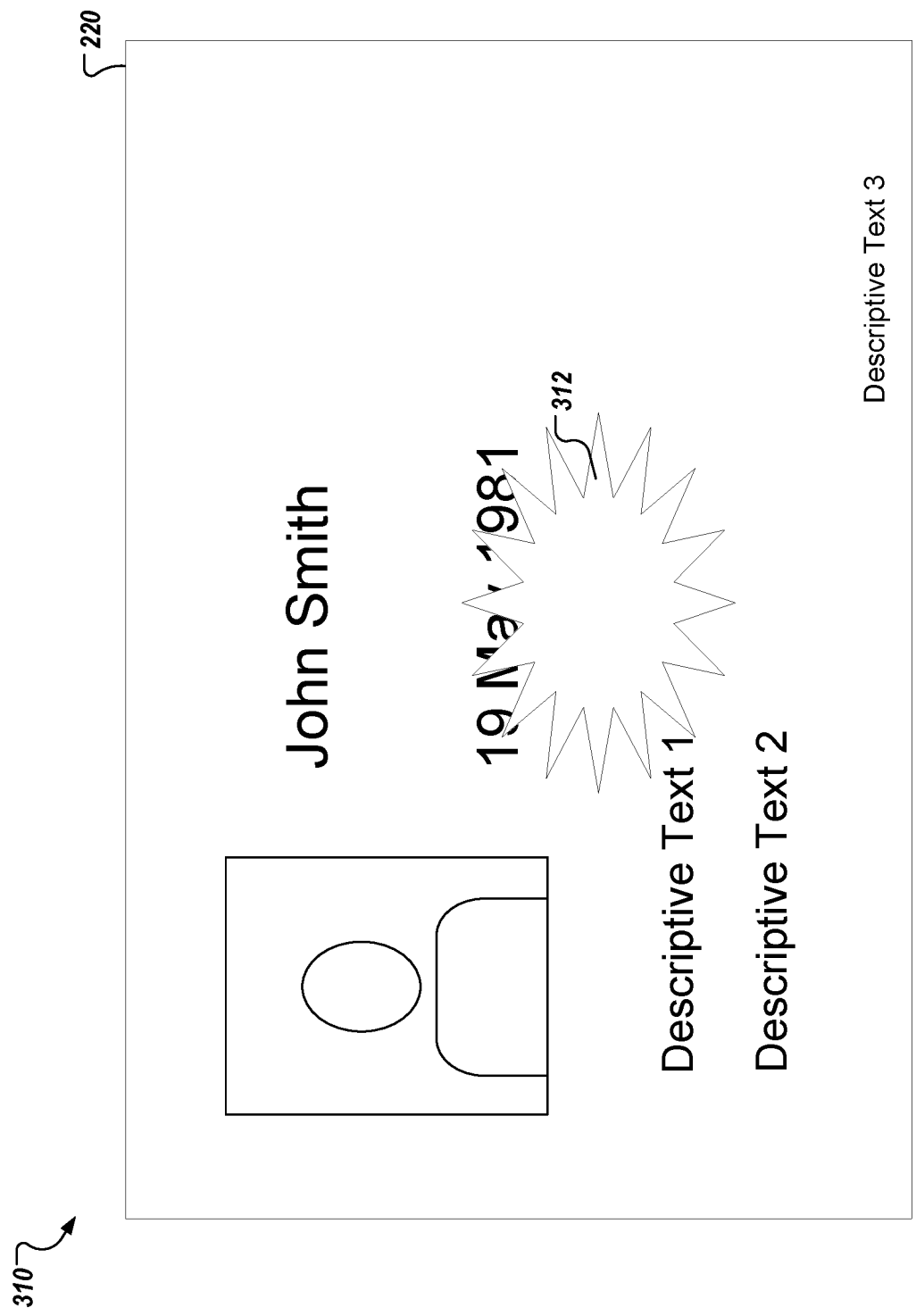
Figure 3C:
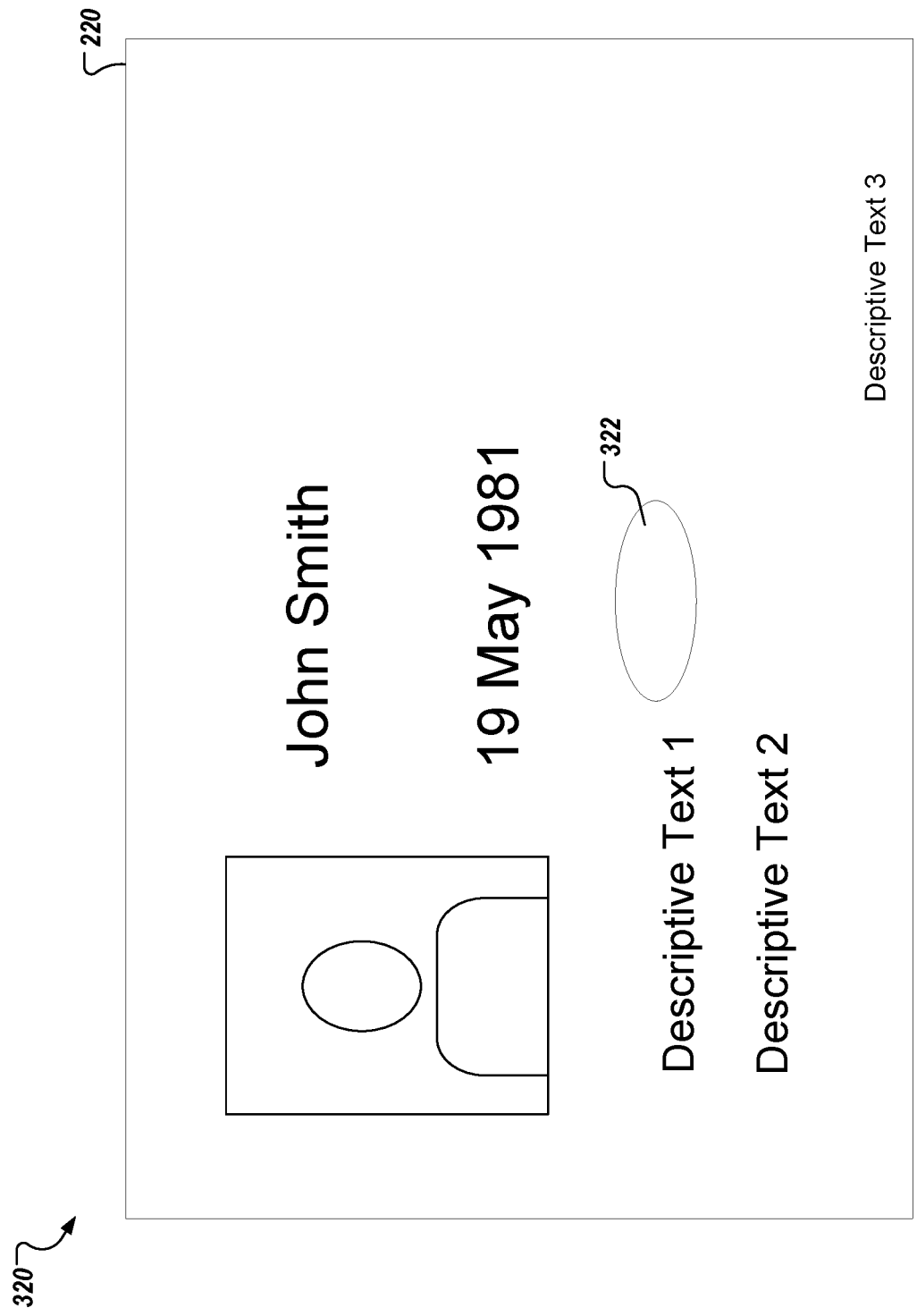

FIGS. 3A-3C each depict example images 300, 310, and 320 respectively. The example images 300, 310, and 320 depict the physical document 220 and each include a respective glare signature. The example image 300 includes a glare signature with glare regions 302 and is an example of an image taken with no flash. The example image 310 includes a glare signature with glare region 312 and is an example of an image taken with a flash. In the example image 310, where there previously was glare (e.g., glare regions 302) in the example no-flash image 300, the glare effect has been reduced and the visibility increased in those glare regions 302. However, as a consequence, there is another glare region, glare region 312, on the flash image corresponding to the new light source introduced (e.g., the flash). Example image 320 is a merged image of the images 300 and 310 resulting from the active lighting system as described herein. The example merged image 320 includes a glare region 322 that represents the overlap between the glare signatures of images 300 and 310 (e.g., two glare regions 302 and 312 from the images). Some merged images generated by the aligned lighting system include no glare region 322 as there is, for example, no overlap between glare regions of the primary and secondary image(s) and/or there is sufficient data to remove the glare regions fully from the merged image.

Figure 4A:
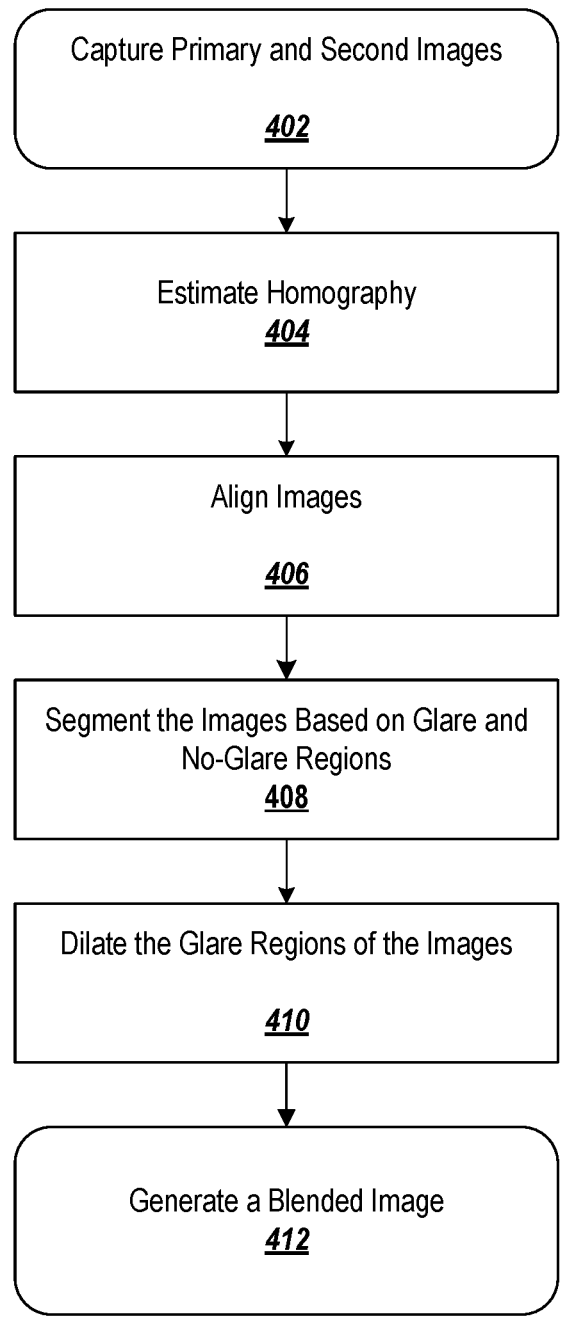
FIGS. 4A-4B depict flow diagrams of example processes employed within an active lighting system to generate a merged image.
Figure 4B:
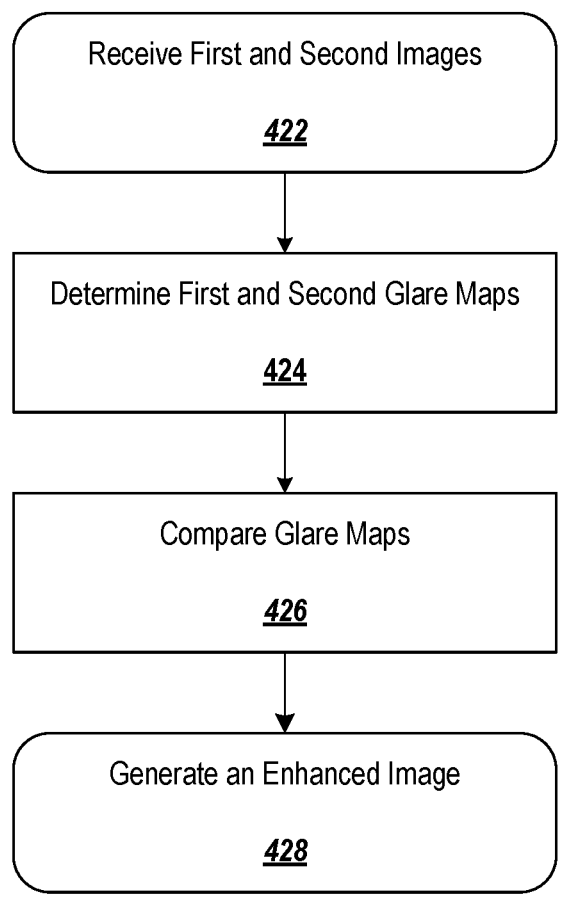

FIGS. 4A-4B depict flow diagrams of example processes 400 and 420 respectively. Processes 400 and 420 are employed within an active lighting system to generate a merged image of, for example, a document for analysis. For clarity of presentation, the description that follows generally describes methods 400 and 420 in the context of FIGS. 1-3C. However, it will be understood that methods 400 and 420 may each be performed, for example, by any other suitable system, environment, software, and hardware, or a combination of systems, environments, software, and hardware as appropriate. In some implementations, various steps of methods 400 and 420 can be run in parallel, in combination, in loops, or in any order.

In process 400, a primary image and a secondary image are captured (402) by, for example, a camera associated with a user device. In some implementations, to minimize the motion of the camera between image captures, the images are taken in succession one after the other and within a threshold temporal distance. Even with a short threshold, there may be a certain degree of camera movement between the images. To account for this movement, the images are aligned. To align the images, a homography (a 3×3 matrix) is estimated (404) using at least four point correspondences between the before and after movement images. The points are computed using a feature detector, such as the FAST algorithm, and the descriptor of each point, used to match points between before and after images is computed using a feature descriptor, such as the ORB algorithm. ORB is a fast robust local feature descriptor and describes the neighborhood of pixel intensities around each location. ORB provides a description of the texture around a two-dimensional landmark (e.g., the physical document) in an image, which is conducive to matching other ORB descriptors in another image (e.g., matching between the primary and secondary images). The homography may be estimated through, for example, a RANSAC algorithm, which involves random trials of estimating the homography using four point correspondences selected at random, counting the number of inliers per trial and choosing the homography with the max number of inlier matches. The images are aligned (406) by warping pixels based on the homography. For example, each pixel for the imaged document in one image is mapped to a corresponding pixel for the imaged document in the other image (e.g., the images are aligned according to the physical documents which are assumed to lie in a 3D plane). Specifically, point [x y 1] is mapped to the other image using coordinate [x' y' w']'=H*[x y 1]', where H is the homography, [x y 1]' is the column vector of coordinate (x, y) as a homogeneous coordinate (1 is added as a third dimension), and [x' y' w']' is the column vector of the mapped homogeneous coordinate (and is converted back to non-homogeneous coordinates using (x'/w', y'/w'). In some implementations, H is a 3×3 matrix which warps homogeneous points lying in one world plane to another world plane under full perspective distortion. In some implementations, using the estimated homography, a bi-linear interpolation is employed to warp each pixel in the secondary image so that it aligns exactly with the primary image.

The aligned images are segmented (408) into glare and no-glare regions based on the glare signature for each image. In some implementations, to segment the images, both the primary and secondary images are converted to grayscale. Glare and no-glare regions within each grey-scale image are identified based on a threshold. For example, a pixel with an intensity greater than the threshold value certain intensity is categorized as glare (e.g., a pixel is a saturated or "white" pixel in the image). Based on this threshold value, a new binary image (e.g., black and white) is generated for each of the primary and secondary images. The binary image is a type of a glare map where each pixel represents either glare or no glare. As an example, a threshold value may be set at 253 out of 255 intensities for an 8-bit grayscale image. Pixels that are greater than the threshold are assigned as foreground in the glare map, otherwise they are assigned as background. Other techniques may be employed by process 400 to segment the images. For example, employing machine learning to train an algorithm according to training data to determine what constitutes glare and no glare regions in an image. In a machine learning approach, a training set of data may be constructed and segmented to represent the ground truth. This affords an opportunity to ensure the boundary of the glare segmentation does not overlap with a critical feature, such as a digit or character of text, or such as a security feature.

For each of the segmented images (e.g., the glare maps), the glare regions are dilated (410) (e.g., the amount of white pixels is expanded slightly to increase the size of the glare regions on each glare map). For example, the glare regions are enlarged until some threshold is met to capture the specular reflection around the edges of the glare regions. In some implementations, a glare detector can be employed to select the optimal pixel and/or group of pixels from each image to use for generating the merged image. For example, a 7×7 dilation kernel on an image with a resolution of 300 dots per inch (DPI) may be used to estimate the document in the images. The flash and no glare maps may be dilated a configurable number of times in succession. The glare regions are filtered in each glare map to keep the largest glare region. The difference between the flash glare map and no-flash glare map is computed setting a threshold for this difference to keep the positive values (e.g., threshold greater than or equal to 0). The largest glare region from this difference is retained.

A blended image is generated (412) from the dilated glare maps. In some implementations, the glare regions in the primary image (e.g., the flash image) are replaced with the respective mapped regions of no-glare from the secondary image (e.g., the no-flash image). In some implementations, when there is glare regions in the same location on the depicted document in the primary and secondary images, the pixels from the primary image (e.g., the flash image) are retained as the base-line for the merged image.

The boundary between the copied pixels from the secondary image to the primary image may be problematic for proper analysis of the document (e.g., tamper detection or OCR analysis may be hindered) when, for example, there are hard, high-frequency contrast areas across a text element of the imaged document. Various modes of blending the merged pixels may be employed in this step, such as Poisson imaging blending. As an example, to employ Poisson image blending, the gradient information or the changes of intensity throughout the entire region that is to be cloned and/or replaced is copied. The copied gradients are used to interpolate or create a new color that is propagated from the boundary of the corresponding region in the merged image. Employing this type of blending locks in the color from the primary image into the copied/replacement region from the secondary image. In some examples, the regions are copied directly from the secondary image and inserted into the merged image without blending. In such examples, the OCR may be trained to recognize these areas properly and accurately determine the validity of the document and/or merged image. For example, pixels may be selected for the merged image from whichever of the source images that has the least of amount of glare. In another example, an accelerated approximation of the Poisson image blending algorithm named MVC for Instant Image Cloning may be used to, for example, increase performance with similar quality to Poisson.

In some examples, when the type of document is known before the flash no-flash merge operation, a template for that document type, such as the most recent US passport, may be used to make content-dependent decisions about how to merge flash and no-flash images. The captured pair of images are both registered to the template using the same homography-based warping technique used to register flash to no-flash. After registering to the template, variable regions specified in the template map to the same regions in both flash and no-flash images. If glare is detected over a portion of a high value region of interest, such as the last name text, the glare region may be expanded so that the entire last name is replaced in the flash image with the no-flash pixels as opposed to just the glare pixels in that region. The template enables the identification of high value regions and correspondingly how to segment and blend in those regions. The document type may be provided by the user or automatically recognized using a separate recognition module.

In process 420, a first and second image of a physical document are received (422). The first image includes a first glare signature, and the second image including a second glare signature that is different from the first glare signature. A first glare map of the first image and a second glare map of the second image are determined (424). The first glare map is compared (426) to the second glare map. A digital image is generated (426) based on the comparison of the first and second glare maps and the process 420 end.

Figure 5:
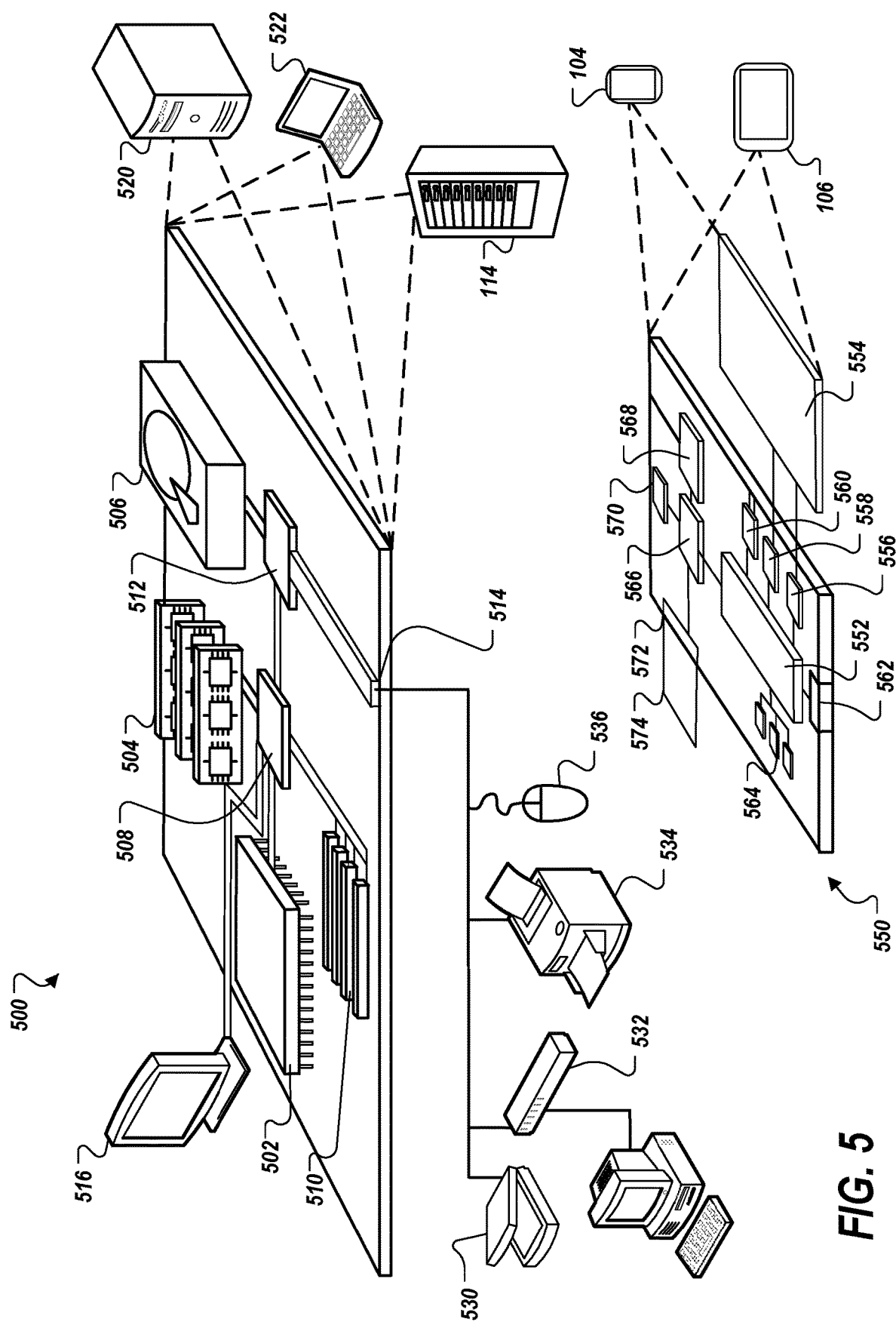
FIG. 5 shows an example of a computing device and a mobile computing device that can be employed to execute implementations of the present disclosure.

FIG. 5 shows an example of a computing device 500 and a mobile computing device 550 that employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. Additionally, computing device 500 and/or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also by coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 114. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device, such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of UIs, applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may also include secure information. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550. The mobile computing device 550 may be implemented in a number of different forms, as shown in FIG. 5. For example, it may be implemented as a mobile computing devices 104 and/or 106 of FIG. 1 and device 202 (not shown) of FIG. 2. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for providing a digital image of a physical document, the method comprising:
   receiving a first image of the physical document having a first glare signature and a second image of the physical document having a second glare signature that is different from the first glare signature;
   determining a first glare map of the first image and a second glare map of the second image;
   comparing the first glare map to the second glare map; and
   generating the digital image based on the comparison of the first and second glare maps.

2. The computer-implemented method of claim 1, wherein the first image is taken with a flash, and wherein the second image is taken without a flash.

3. The computer-implemented method of claim 1, wherein the first image and the second image are taken in succession within a threshold temporal distance.

4. The computer-implemented method of claim 1, compromising:
   before determining the first glare map of the first image and the second glare map of the second image, aligning the first image and the second image based on the physical document.

5. The computer-implemented method of claim 4, wherein aligning the first image and the second image includes:
   estimating a homography using features from accelerated segment test (FAST) detector and an oriented FAST and rotated Binary Robust Independent Elementary Features (ORB) detector to provide a description of texture around the physical document as depicted in each image; and
   warping each pixel in the second image with the first image through a bi-linear interpolation.

6. The computer-implemented method of claim 5, wherein the homography is estimated based on a random sample consensus (RANSAC) algorithm.

7. The computer-implemented method of claim 1, wherein determining the first glare map of the first image includes generating a first greyscale image of the first image, and determining a second glare map of the second image includes generating a second greyscale image of the second image.

8. The computer-implemented method of claim 1, wherein the first glare map and the second glare map are each binary images where each pixel represents either glare or no glare.

9. The computer-implemented method of claim 1, further comprising:
   before comparing the first glare map to the second glare map, dilating the first glare map and the second glare map to expanded regions of glare represent on each map.

10. The computer-implemented method of claim 9, wherein the digital image is generated by replacing the regions of glare in the first image with respective mapped regions from the second image, wherein the mapped regions from the second image do not include glare.

11. The computer-implemented method of claim 10, wherein the mapped regions from the second image are merged into the first image to form the digital image through Poisson imaging blending.

12. The computer-implemented method of claim 11, wherein gradient information throughout the replaced regions of glare is employed to interpolate a color propagated from a boundary of each replaced glare region in the generated digital image.

13. The computer-implemented method of claim 10, wherein the mapped regions from the second image are merged into the first image to form the digital image through a Mean Value Coordinates (MVC) for Instant Image Cloning algorithm.

14. The computer-implemented method of claim 1, wherein the digital image is employed in an analysis of the physical document to identify text or data elements in the physical document.

15. The computer-implemented method of claim 14, wherein the analysis of the physical document includes at least one of optical character recognition (OCR), optical word recognition (OWR), intelligent character recognition (ICR), intelligent word recognition (IWR), natural language processing (NLP), or machine learning.

16. The computer-implemented method of claim 1, wherein the digital image is employed in an analysis of the physical document to detect digital tampering or physical tampering.

17. The computer-implemented method claim 1, wherein the physical document is a professional or government-issued credentials or certifications.

18. One or more non-transitory computer-readable storage media coupled to one or more processors and having instructions stored thereon which, when executed by the one or more processors, cause the one or more processors to perform operations comprising:
  receiving a first image of a physical document having a first glare signature and a second image of the physical document having a second glare signature that is different from the first glare signature;
  determining a first glare map of the first image and a second glare map of the second image;
  comparing the first glare map to the second glare map; and
  generating a digital image based on the comparison of the first and second glare maps.

19. The one or more non-transitory computer-readable storage media of claim 18, wherein the digital image is employed in an analysis of the physical document to identify text or data elements in the physical document or to detect digital tampering or physical tampering, wherein the analysis of the physical document includes at least one of optical character recognition (OCR), optical word recognition (OWR), intelligent character recognition (ICR), intelligent word recognition (IWR), natural language processing (NLP), or machine learning, and wherein the physical document is a professional or government-issued credentials or certifications.

20. A system, comprising:
  one or more processors; and
  a computer-readable storage device coupled to the one or more processors and having instructions stored thereon which, when executed by the one or more processors, cause the one or more processors to perform operations comprising:
    receiving a first image of a physical document having a first glare signature and a second image of the physical document having a second glare signature that is different from the first glare signature;
    aligning the first image and the second image based on the physical document by:
      estimating a homography using features from accelerated segment test (FAST) detector and an oriented FAST and rotated Binary Robust Independent Elementary Features (ORB) detector to provide a description of texture around the physical document as depicted in each image; and
      warping each pixel in the second image with the first image through a bi-linear interpolation;
    determining a first glare map of the first image by generating a first greyscale image of the first image;
    determining a second glare map of the second image by generating a second greyscale image of the second image;
    dilating the first glare map and the second glare map to expanded regions of glare represent on each map;
    comparing the first glare map to the second glare map; and
    generating a digital image by replacing the regions of glare in the first image with respective mapped regions from the second image, wherein the mapped regions from the second image do not include glare.

* * * * *

UNITED STATES PATENT AND TRADEMARK OFFICE
CERTIFICATE OF CORRECTION

| | |
|---|---|
| PATENT NO. | : 11,195,047 B2 |
| APPLICATION NO. | : 16/437869 |
| DATED | : December 7, 2021 |
| INVENTOR(S) | : Richard Austin Huber, Jr., Matthew William Flagg and Satya Prakash Mallick |

It is certified that error appears in the above-identified patent and that said Letters Patent is hereby corrected as shown below:

In the Claims

Column 16, Line 16-17 Claim 4, delete "compromising" and insert -- comprising -- therefore.

Column 17, Line 18 Claim 17, delete "method" and insert -- method of -- therefore.

Signed and Sealed this
Twenty-eighth Day of October, 2025

John A. Squires
*Director of the United States Patent and Trademark Office*